(12) United States Patent
Yue et al.

(10) Patent No.: US 11,816,132 B2
(45) Date of Patent: Nov. 14, 2023

(54) METHOD AND SYSTEM FOR OPTIMIZING DATA STORAGE OF QUERY STATISTICS OF GRAPH DATABASE

(71) Applicant: Vesoft Inc., Hangzhou (CN)

(72) Inventors: Tong Yue, Hangzhou (CN); Xiaomeng Ye, Hangzhou (CN); Yujue Wang, Hangzhou (CN); Yu Liu, Hangzhou (CN); Min Wu, Hangzhou (CN); Chenguang Wang, Hangzhou (CN)

(73) Assignee: Vesoft Inc., Zhejiang (CN)

( * ) Notice: Subject to any disclaimer, the term of this patent is extended or adjusted under 35 U.S.C. 154(b) by 111 days.

(21) Appl. No.: 17/448,376

(22) Filed: Sep. 22, 2021

(65) Prior Publication Data

US 2022/0335068 A1  Oct. 20, 2022

(30) Foreign Application Priority Data

Apr. 20, 2021 (CN) .......................... 202110422515.0
Apr. 22, 2021 (CN) .......................... 202110438145.X

(51) Int. Cl.
*G06F 16/28* (2019.01)
*G06F 16/2458* (2019.01)
*G06F 11/34* (2006.01)

(52) U.S. Cl.
CPC ........ *G06F 16/285* (2019.01); *G06F 11/3409* (2013.01); *G06F 11/3452* (2013.01); *G06F 16/2462* (2019.01)

(58) Field of Classification Search
CPC ............... G06F 16/285; G06F 11/3409; G06F 11/3452; G06F 16/2462; G06F 2201/80; G06F 16/28
See application file for complete search history.

(56) References Cited

U.S. PATENT DOCUMENTS

| 2008/0098375 A1* | 4/2008 | Isard | G06F 11/1438 |
| | | | 717/149 |
| 2015/0350324 A1* | 12/2015 | Hu | H04L 67/1031 |
| | | | 709/219 |
| 2016/0342708 A1* | 11/2016 | Fokoue-Nkoutche | |
| | | | G06F 16/9024 |

(Continued)

*Primary Examiner* — Apu M Mofiz
*Assistant Examiner* — Oscar Wehovz
(74) *Attorney, Agent, or Firm* — ZIEGLER IP LAW GROUP LLC

(57) ABSTRACT

Disclosed are a method and a system for optimizing data storage of query statistics of a graph database. The method includes: periodically scanning, on storage servers in which partitions are located, all edges in the partitions; determining, according to all the edges in the partitions, partitions to which start points and end points belong, and calculating outgoing-edge correlation and incoming-edge correlation between partitions; calculating relevancies between partitions through a preset correlation matrix weight according to the outgoing-edge correlation and the incoming-edge correlation between partitions; and storing partitions with high relevancies on a same storage server. The present disclosure solves the problems of difficult optimization of storage distribution, as well as high resource consumption and low efficiency of query statistics of a graph database, and implements partition distribution of a graph database with an optimized distribution architecture, thereby reducing resource consumption of data calling and improving performance of the graph database.

16 Claims, 6 Drawing Sheets

(56) References Cited

U.S. PATENT DOCUMENTS

| | | | |
|---|---|---|---|
| 2017/0068746 A1* | 3/2017 | Levin | G06F 16/9024 |
| 2017/0293534 A1* | 10/2017 | Auvenshine | G06F 11/1464 |
| 2018/0039710 A1* | 2/2018 | Chen | G06F 16/9024 |
| 2018/0267831 A1* | 9/2018 | Nukariya | G06F 9/5083 |
| 2021/0004374 A1* | 1/2021 | Xia | G06F 16/9024 |

* cited by examiner

METHOD AND SYSTEM FOR OPTIMIZING DATA STORAGE OF QUERY STATISTICS OF GRAPH DATABASE

CROSS REFERENCE TO RELATED APPLICATION(S)

This patent application claims the benefit and priority of Chinese Patent Application No. 202110422515.0 filed on Apr. 20, 2021 and Chinese Patent Application No. 202110438145.X filed on Apr. 22, 2021, the disclosure of which is incorporated by reference herein in its entirety as part of the present application.

TECHNICAL FIELD

The present disclosure relates to the field of data processing and statistics, and in particular, to a method and system for optimizing data storage of query statistics of a graph database.

BACKGROUND

With the rapid development of big data technology and artificial intelligence technology, hyper-scale relational networks are gradually being widely used in social recommendation, risk control, Internet of Things, blockchain, security and other fields. Such hyper-scale relational networks are usually based on the graph theory in data structure. Core elements that make up a graph (relational network) include: nodes (also known as vertices) and properties of the nodes, and relationships (also known as edges) and properties of the relationships. For example, in social networks, nodes can correspond to individuals, and properties of the nodes can be emails, accounts, etc.; relationships can correspond to friend relationships or transfer relationships, and properties of the relationships can be transfer amounts, transfer times, etc., and the relationships are directional. Since a node-relationship-property model of the graph theory can describe a relational network conveniently, a graph database based on the graph theory is usually chosen to store the hyper-scale relational network at present.

As the data volume grows much faster than Moore's law, it becomes increasingly difficult for stand-alone graph databases, such as Neo4j 3.X, RedisGraph, etc., to meet the rapidly growing data storage needs and data processing requirements. Therefore, distributed graph databases become a preferred solution.

At present, for a distributed graph database, data is continuously changing, and static data scenarios are rare. To achieve load balancing of graph data storage, a distributed graph database architecture with fully symmetric distribution can be used, such as Nebula Graph, where the query and storage nodes of Nebula Graph adopt a fully symmetric distributed architecture, and the stored data of vertices and edges are allocated to different partitions through a certain algorithm (e.g. hash), and different partitions are distributed on different servers. In addition, Raft algorithm is used to maintain data consistency among multiple copies of a partition. However, such databases do not require users to inform graph feature information and request features, it is still difficult to optimize the partition distribution of graph data, and there are problems of random data localization and high network communication overheads, as well as problems of high consumption of computational resources and low efficiency of real-time statistics during statistical collection of graph data.

At present, there is no effective solution to the problems of difficult optimization of storage distribution, as well as high resource consumption and low efficiency of query statistics of the graph database in the related art.

SUMMARY

Embodiments of the present disclosure provide a data storage method and system that optimize query statistics of a graph database, to solve the problems of difficult optimization of storage distribution, as well as high resource consumption and low efficiency of query statistics of the graph database in the related art.

According to a first aspect, the embodiments of the present disclosure provide a method for optimizing data storage of query statistics of a graph database, including:

periodically scanning, on storage servers in which partitions are located, all edges in the partitions;

determining, according to all the edges in the partitions, partitions to which start points and end points belong, and calculating outgoing-edge correlation and incoming-edge correlation between partitions;

calculating relevancies between partitions through a preset correlation matrix weight according to the outgoing-edge correlation and the incoming-edge correlation between partitions; and storing partitions with high relevancies on a same storage server.

In some embodiments, the calculating outgoing-edge correlation and incoming-edge correlation between partitions includes:

calculating the outgoing-edge correlation between partitions based on the following formula:

$$OUT_{ij} \triangleq \begin{cases} \dfrac{\text{out\_edge\_count}_i^j}{\text{out\_total\_edge}_i} & \text{if } i \neq j, \\ 1 & \text{if } i = j \end{cases}$$

where $OUT_{ij}$ represents outgoing-edge correlation between partition i and partition j, $\text{out\_total\_edge}_i$ represents a total number of outgoing edges with start points in partition i, and $\text{out\_edge\_count}_i^j$ represents the number of outgoing edges with start points located in partition i and end points located in partition j; and calculating the incoming-edge correlation between partitions based on the following formula:

$$IN_{ij} \triangleq \begin{cases} \dfrac{\text{in\_edge\_count}_i^j}{\text{in\_total\_edge}_i} & \text{if } i \neq j, \\ 1 & \text{if } i = j \end{cases}$$

where $IN_{ij}$ represents incoming-edge correlation between partition i and partition j, $\text{in\_total\_edge}_i$ represents a total number of incoming edges with end points in partition i, and $\text{in\_edge\_count}_i^j$ represents the number of incoming edges with start points located in partition j and end points located in partition i.

In some embodiments, the calculating relevancies between partitions through a preset correlation matrix weight according to the outgoing-edge correlation and the incoming-edge correlation between partitions includes:

calculating the relevancies between partitions according to the outgoing-edge correlation and the incoming-edge correlation between partitions and the preset correlation matrix weight based on the following formula:

$R_{ij}=\alpha OUT_{ij}+(1-\alpha) IN_{ij}$, where α is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

In some embodiments, the storing partitions with high relevancies on a same storage server includes: performing the following steps for each storage server:
  randomly acquiring any partition as a target partition; and
  acquiring and storing a plurality of partitions having highest relevancies with the target partition;
  where the target partition is a partition not stored in other data services, and each storage server stores a same number of partitions.

In some embodiments, the storing partitions with high relevancies on a same storage server includes:
storing the partitions in a distributed manner through a METIS algorithm or a greedy algorithm, and storing partitions with high relevancies on a same storage server.

In some embodiments, after the storing partitions with high relevancies on a same storage server, the method further includes:
  acquiring a query statistics request for data, and conducting query statistics on data in the partitions according to the query statistics request.

In some embodiments, the acquiring a query statistics request for data, and conducting query statistics on data in the partitions according to the query statistics request includes:
  acquiring a task request for counting vertices and edges in a graph space, returning IDs of preset ready jobs in a ready queue according to the task request, and recording information, where the graph space includes a plurality of partitions;
  grouping the preset ready jobs according to leader nodes to which the partitions belong, to obtain a plurality of preset execution tasks; and
  submitting the preset execution tasks to an execution queue and running the preset execution tasks by the storage server.

In some embodiments, the returning IDs of preset ready jobs according to the task request includes:
  checking, by a meta server according to the task request, whether a preset ready job in the ready queue exists;
  if yes, returning the ID of the preset ready job; or
  if not, generating a preset ready job, submitting the preset ready job to the ready queue, and returning an ID of the preset ready job.

In some embodiments, the recording information includes:
  writing information records of the preset ready jobs into system tables of the preset ready jobs by a meta server according to the IDs of the preset ready jobs; and
  writing an information record of the graph space into a system table of statistical information by the meta server according to an ID of the graph space.

In some embodiments, the submitting the preset execution tasks to an execution queue and running the preset execution tasks by the storage server includes:
  writing information records of the preset execution tasks into system tables of the preset execution tasks by a meta server according to the IDs of the preset ready jobs and IDs of the preset execution tasks, and running the preset execution tasks by the storage server.

In some embodiments, the submitting the preset execution tasks to an execution queue and running the preset execution tasks by the storage server includes:
  submitting the preset execution tasks to the execution queue by the storage server, generating preset execution subtasks according to the partitions, and running the preset execution subtasks by the storage server;
  determining that running of a corresponding preset execution task succeeds if running of all preset execution subtasks in the preset execution task succeeds; or
  determining that running of a corresponding preset execution task fails if running of a preset execution subtask in the preset execution task fails.

In some embodiments, after the running the preset execution tasks by the storage server, the method further includes:
  checking whether running of the preset execution task succeeds;
  if yes, setting a corresponding status record in a system table of the preset execution task to a finished state by a meta server, where
  in a case that running of the preset execution task succeeds, a system table of statistical information is updated based on a locking mechanism according to a running result of the preset execution task, and
  in a case that running of all the preset execution tasks is finished and successful, corresponding status records in the system table of the statistical information and system tables of the preset ready jobs are set to a finished state; or
  if not, setting the corresponding status record in the system table of the preset execution task to a failed state by the meta server, where
  in a case that running of the preset execution task fails, the system table of the statistical information is updated based on the locking mechanism according to the running result of the preset execution task, and
  in a case that running of all the preset execution tasks is finished and a running failure occurs, corresponding status records in the system table of the statistical information and the system tables of the preset ready jobs are set to a failed state.

In some embodiments, the submitting the preset execution tasks to the execution queue by the storage server, generating preset execution subtasks according to the partitions, and running the preset execution subtasks by the storage server includes:
  submitting the preset execution tasks to the execution queue by the storage server, generating the preset execution subtasks according to the partitions, collecting statistics about vertex and edge count information of the corresponding partitions through the preset execution subtasks, and aggregating statistical results of all the preset execution subtasks, where the vertex and edge count information includes the number of vertices with a same tag, the number of edges of a same type, and a total number of vertices and a total number of edges in the graph space.

In some embodiments, the acquiring a query statistics request for data, and conducting query statistics on data in the partitions according to the query statistics request includes:
  acquiring a task request for querying a data relationship, acquiring a start point and traversal depth as a query condition according to the task request, querying relational data of the start point according to the query condition, and querying whether there is a pre-read result in the storage server;

if yes, the storage server continues to finish the data relationship query of the start point according to the pre-read result and the traversal depth; and if no, the storage server continues to finish the data relationship query of the start point according to the relational data and the traversal depth.

In some embodiments, after the data relationship query of the start point is finished, the method further includes:

obtaining a query result and the pre-read result after finishing the data relationship query of the start point, and caching the pre-read result in the storage server.

According to a second aspect, the embodiments of the present disclosure provide a system for optimizing data storage of query statistics of a graph database, including a query server, a meta server, and storage servers;

where the meta server periodically scans, on the storage servers in which partitions are located, all edges in the partitions;

the storage server determines, according to all the edges in the partitions, partitions to which start points and end points belong, and calculates outgoing-edge correlation and incoming-edge correlation between partitions; and the storage server calculates relevancies between partitions through a preset correlation matrix weight according to the outgoing-edge correlation and the incoming-edge correlation between partitions, where partitions with high relevancies are stored on a same storage server.

In some embodiments, the storage server calculates the outgoing-edge correlation and the incoming-edge correlation between partitions in the following manner:

calculating the outgoing-edge correlation between partitions based on the following formula:

$$OUT_{ij} \triangleq \begin{cases} \dfrac{\text{out\_edge\_count}_i^j}{\text{out\_total\_edge}_i} & \text{if } i \neq j \\ 1 & \text{if } i = j \end{cases},$$

where $OUT_{ij}$ represents outgoing-edge correlation between partition i and partition j, $\text{out\_total\_edge}_i$ represents a total number of outgoing edges with start points in partition i, and $\text{out\_edge\_count}_i^j$ represents the number of outgoing edges with start points located in partition i and end points located in partition j; and calculating the incoming-edge correlation between partitions based on the following formula:

$$IN_{ij} \triangleq \begin{cases} \dfrac{\text{in\_edge\_count}_i^j}{\text{in\_total\_edge}_i} & \text{if } i \neq j \\ 1 & \text{if } i = j \end{cases},$$

where $IN_{ij}$ represents incoming-edge correlation between partition i and partition j $\text{in\_total\_edge}_i$ represents a total number of incoming edges with end points in partition i, and $\text{in\_edge\_count}_i^j$ represents the number of incoming edges with start points located in partition j and end points located in partition i.

In some embodiments, the storage server calculates the relevancies between partitions through the preset correlation matrix weight according to the outgoing-edge correlation and the incoming-edge correlation between partitions in the following manner:

calculating the relevancies between partitions according to the outgoing-edge correlation and the incoming-edge correlation between partitions and the preset correlation matrix weight based on the following formula: $R_{ij}=\alpha OUT_{ij}+(1-\alpha)IN_{ij}$, where $\alpha$ is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

In some embodiments, after the partitions with high relevancies are stored on the same storage server, the query server acquires a task request for counting vertices and edges in a graph space, and the meta server checks preset ready jobs in a ready queue according to the task request, and returns IDs of the preset ready jobs;

the meta server writes information records of the preset ready jobs into system tables of the preset ready jobs according to the IDs of the preset ready jobs, and the meta server writes an information record of the graph space into a system table of statistical information according to an ID of the graph space;

the graph space includes a plurality of partitions, and the meta server groups the preset ready jobs according to leader nodes to which the partitions belong, to obtain a plurality of preset execution tasks; and the meta server sends the preset execution tasks to the storage server, the storage server submits the preset execution tasks to an execution queue, and the storage server runs the preset execution tasks.

In some embodiments, after the partitions with high relevancies are stored on the same storage server, the query server acquires a task request for querying a data relationship;

the storage server acquires a start point and traversal depth as a query condition according to the task request, queries relational data of the start point according to the query condition, and queries whether there is a pre-read result in the storage server;

if yes, the storage server continues to finish the data relationship query of the start point according to the pre-read result and the traversal depth; and if no, the storage server continues to finish the data relationship query of the start point according to the relational data and the traversal depth.

Compared with the related art, in the method and system for optimizing data storage of query statistics of a graph database provided by the embodiments of the present disclosure, all edges in partitions are periodically scanned on storage servers in which the partitions are located; partitions to which start points and end points belong are determined according to all the edges in the partitions, and outgoing-edge correlation and incoming-edge correlation between partitions are calculated; relevancies between partitions are calculated through a preset correlation matrix weight according to the outgoing-edge correlation and the incoming-edge correlation between partitions; and partitions with high relevancies are stored on a same storage server. The present disclosure solves the problems of difficult optimization of storage distribution, as well as high resource consumption and low efficiency of query statistics of a graph database, and implements partition distribution of a graph database with an optimized distribution architecture, thereby reducing resource consumption of data calling and improving performance of the graph database.

BRIEF DESCRIPTION OF THE DRAWINGS

The accompanying drawings described here are provided for further understanding of the present disclosure, and constitute a part of the present disclosure. The exemplary embodiments of the present disclosure and illustrations thereof are intended to explain the present disclosure, but do not constitute inappropriate limitations to the present disclosure. In the drawings.

Figure 1:
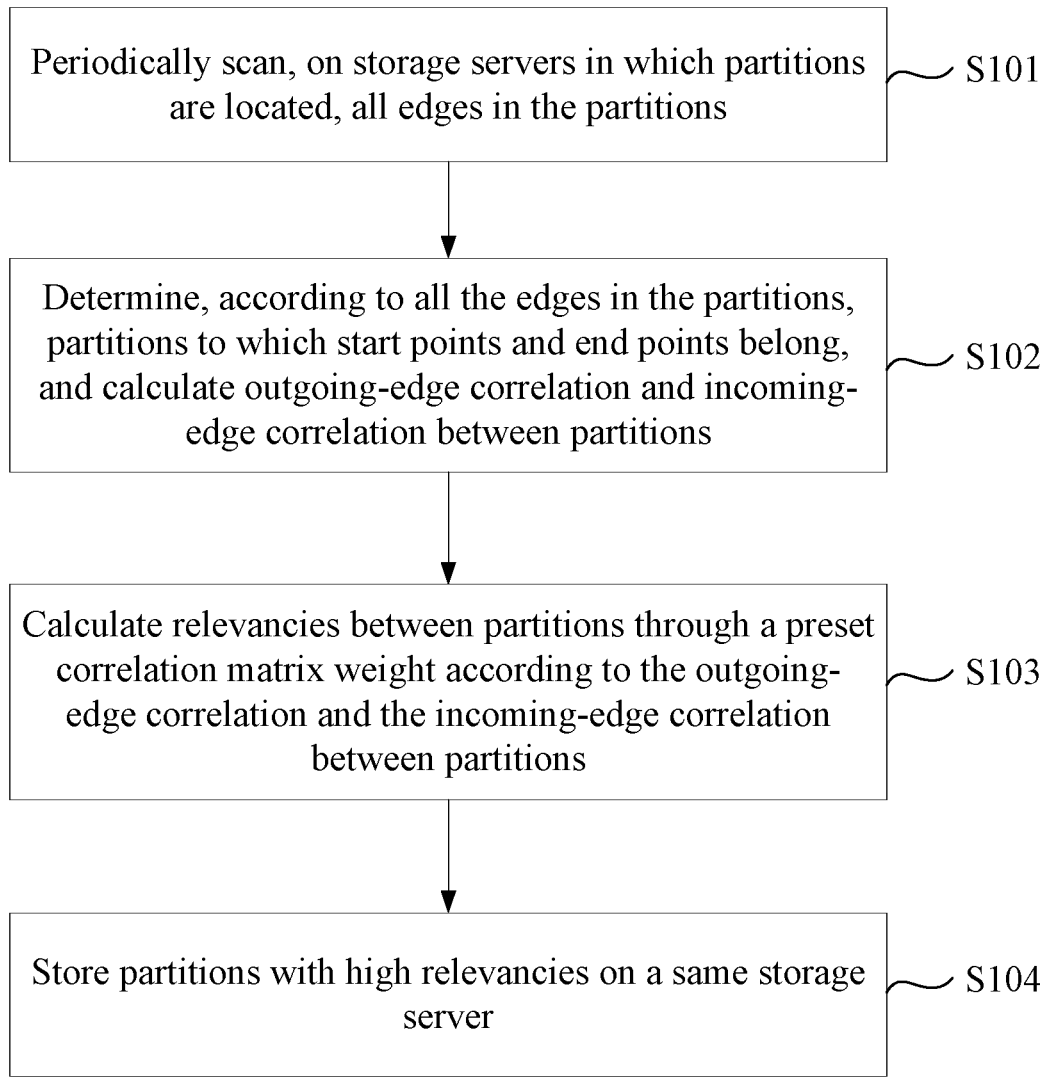
FIG. 1 is a flowchart of steps of a method for optimizing data storage of query statistics of a graph database according to an embodiment of the present disclosure.

Reference numerals: 61. query server; 62. meta server; 63. storage server.

DETAILED DESCRIPTION

To make the objectives, technical solutions, and advantages of the present disclosure clearer, the present disclosure is described below with reference to the accompanying drawings and embodiments. It should be understood that the embodiments described herein are merely used to explain the present disclosure, rather than to limit the present disclosure. All other embodiments obtained by those of ordinary skill in the art based on the embodiments of the present disclosure without creative efforts should fall within the protection scope of the present disclosure.

Apparently, the accompanying drawings in the following description show merely some embodiments of the present disclosure, and a person of ordinary skill in the art may apply the present disclosure to other similar scenarios according to these drawings without creative efforts. In addition, it can also be appreciated that, although it may take enduring and complex efforts to achieve such a development process, for those of ordinary skill in the art related to the present disclosure, some changes such as design, manufacturing or production made based on the technical content in the present disclosure are merely regular technical means, and should not be construed as insufficiency of the present disclosure.

The "embodiment" mentioned in the present disclosure means that a specific feature, structure, or characteristic described in combination with the embodiment may be included in at least one embodiment of the present disclosure. The phrase appearing in different parts of the specification does not necessarily refer to the same embodiment or an independent or alternative embodiment exclusive of other embodiments. It may be explicitly or implicitly appreciated by those of ordinary skill in the art that the embodiment described herein may be combined with other embodiments as long as no conflict occurs.

Unless otherwise defined, the technical or scientific terms used in the present disclosure are as they are usually understood by those of ordinary skill in the art to which the present disclosure pertains. The terms "one", "a", "the" and similar words are not meant to be limiting, and may represent a singular form or a plural form. The terms "include", "contain", "have" and any other variants in the present disclosure mean to cover the non-exclusive inclusion, for example, a process, method, system, product, or device that includes a series of steps or modules (units) is not necessarily limited to those steps or units which are clearly listed, but may include other steps or units which are not expressly listed or inherent to such a process, method, system, product, or device. "Connected", "interconnected", "coupled" and similar words in the present disclosure are not restricted to physical or mechanical connections, but may include electrical connections, whether direct or indirect. The term "multiple" in the present disclosure means two or more. The term "and/or" describes associations between associated objects, and it indicates three types of relationships. For example, "A and/or B" may indicate that A exists alone, A and B coexist, or B exists alone. The character "/" generally indicates that the associated objects are in an "or" relationship. The terms "first", "second", "third" and so on in the present disclosure are intended to distinguish between similar objects but do not necessarily indicate a specific order of the objects.

The method and system for optimizing data storage of query statistics of a graph database is applicable to a distributed graph database that stores vertices and edges in a key-value mode and implements "edge-cutting" storage, e.g., Nebula Graph. Nebula Graph is used as an example:

Nebula Graph: an open source distributed graph database.

Specifically, Nebula Graph mainly includes three modules: a query server (computing module), a storage server (storage module), and a meta server (metadata management module). The three modules communicate with each other through RPC, where the architecture of the storage server (storage module) is functionally divided into three layers from bottom to top, which are a kv layer (key-value library), a raft layer and an api layer. RPC communication refers to remote procedure call, which can usually be considered as calling a method in a remote computer process, and can be simply understood as a network communication process.

Graph: the smallest logical unit of a relational network, which can completely describe entities in the relational network, relationships between entities, as well as properties attached to the entities and properties attached to the relationships between entities.

Vertex: a generic term for entities, where the vertex is further classified as a start point (Vertex_key_src) or an end point (Vertex_key_dst).

Edge: a generic term for relationships between entities, where the edge is further classified as an outgoing edge (Edge_key_src_dst) or an incoming edge (Edge_key_dst_src).

Property: property attached to a vertex or an edge, where a data type of the property can be INT, BOOL, STRING or DOUBLE, etc.

Space: a graph space can be understood as a storage unit of a relational network; in Nebula Graph, the graph space is a logical storage unit of the graph.

Partition: physical storage partition of Nebula Graph, where one graph space contains multiple partitions, each partition has multiple copies (followers) distributed on different nodes, and the consistency of partitions is guaranteed by a Raft distributed protocol.

Graph schema: a generic term for models in a graph. The graph schema defines a logical structure of an entity or relational data storage. For example, if "person" is used as an entity, related properties of "person" can be defined as a graph schema, which contains properties such as name, age, gender, etc.

Tag schema: a subclass of the graph schema, mainly used for defining properties of an entity, where the tag schema has a global unique ID, called TagID.

Edge schema: another subclass of the graph schema, mainly used for defining properties of the relationship between entities. For example, a relationship between entities "people" can be defined as an edge schema, and has the following properties: relationship (family, friend, colleague, classmate), interaction time, common hobby, etc., and the edge schema also has a global unique ID, called EdgeType.

It should be noted that in Nebula Graph, the start point (Vertex_key_src) and the outgoing edge (Edge_key_src_dst) are stored in the same partition (partition$_{src}$), and the incoming edge (Edge_key_dst_src) and the end point (Vertex_key_dst) are also stored in the same partition (partition$_{dst}$).

Then, in a query for outgoing edges (src→dst), it is only necessary to access Vertex_key_src and Edge_key_src_dst in partition$_{src}$, without accessing partition$_{dst}$. In a query for incoming edges (dst→src), it is only necessary to access Vertex_key_dst and Edge_key_dst_src in partition$_{dst}$, without accessing partition$_{src}$.

The above redundant design of edges <Edge_key_src_dst, Edge_key_dst_src> means that based on one of a vertex and an edge, the other can be found in the same partition. Therefore, although one more copy of data is stored, one less RPC is required.

In addition, Nebula Graph has a rebalance function. Specifically, the rebalance of partition consists of two parts: first, a copy of a partition (corresponding hard disk file) is moved from one server to another server completely; second, a leader of a plurality of copies of the partition are changed, the role of the original leader is canceled, and a new leader is selected from the plurality of copies. The rebalancing operation can improve a storage space of a server cluster (files are moved from one server to another) and improve the request load distribution of the server cluster (leader is migrated from one server to another). Of course, both rebalancing operations are based on certain optimization algorithms.

The embodiments of the present disclosure provide a method for optimizing data storage of query statistics of a graph database. FIG. 1 is a flowchart of steps of a method for optimizing data storage of query statistics of a graph database according to an embodiment of the present disclosure. The method includes the following steps:

Step S101: Periodically scan, on storage servers in which partitions are located, all edges in the partitions.

Specifically, a task scheduling request is periodically submitted to a JobManager component in the meta server of the distributed graph database in the form of a background task. When receiving the task scheduling request, the JobManager component generates a task descriptor and, based on partition information, generates a set of tasks according to the task scheduling request. The tasks are actual running tasks on each storage server. The task is to scan all edges in data partitions. The task is distributed to storage servers storing the partitions, to realize sequential scanning (sequential scanning of corresponding hard disk files) of all edges in the partitions.

Step S102: Determine, according to all the edges in the partitions, partitions to which start points and end points belong, and calculate outgoing-edge correlation and incoming-edge correlation between partitions.

Step S103: Calculate relevancies between partitions through a preset correlation matrix weight according to the outgoing-edge correlation and the incoming-edge correlation between partitions.

Step S104: Storing partitions with high relevancies on a same storage server.

By step S101 to step S104 in the embodiments of the present disclosure, distributed scanning tasks are executed periodically to comprehensively scan the distributed graph database to obtain all edges in the partitions; the outgoing-edge correlation and the incoming-edge correlation between partitions are calculated to obtain relevancies between partitions; based on the relevancies between partitions, the partition distribution of the distributed graph database is optimized. Because the graph data itself has a large number of local aggregation characteristics, partitions with high relevancies are stored in the same storage server for storage services, thus solving the problems of difficult optimization of storage distribution, high resource consumption and low efficiency of query statistics of a graph database, implementing partition distribution of a graph database with an optimized distribution architecture, improving data localization, reducing the resource consumption of data calling, reducing the number of RPC operations, and improving the performance of the graph database.

In some embodiments, in S102, the outgoing-edge correlation and the incoming-edge correlation between partitions are calculated.

Specifically, the outgoing-edge correlation between partitions is calculated based on the following formula:

$$OUT_{ij} \triangleq \begin{cases} \dfrac{\text{out\_edge\_count}_i^j}{\text{out\_total\_edge}_i} & \text{if } i \neq j, \\ 1 & \text{if } i = j \end{cases}$$

where $OUT_{ij}$ represents outgoing-edge correlation between partition i and partition j, out_total_edge$_i$ represents a total number of outgoing edges with start points in partition i, and out_edge_count$_i^j$ and represents the number of outgoing edges with start points located in partition i and end points located in partition j; and calculating the incoming-edge correlation between partitions based on the following formula:

$$IN_{ij} \triangleq \begin{cases} \dfrac{\text{in\_edge\_count}_i^j}{\text{in\_total\_edge}_i} & \text{if } i \neq j; \\ 1 & \text{if } i = j \end{cases}$$

where $IN_{ij}$ represents incoming-edge correlation between partition i and partition j, in_total_edge$_i$ represents a total number of incoming edges with end points in partition i, and in_edge_count$_i^j$ represents the number of incoming edges with start points located in partition j and end points located in partition i.

It should be noted that the calculation of $IN_{ij}$ and $OUT_{ij}$ only require the data of partition i (data slice i) itself and does not depend on any information of partition j (data slice j). During calculation of the correlation (outgoing-edge correlation and incoming-edge correlation) of a partition with all other N−1 partitions, it is only necessary to perform a full scan on the partition itself, with time complexity O(dim(Partition i)), which is equivalent to the size of partition i.

In some embodiments, in step S103, the relevancies between partitions are calculated through the preset correlation matrix weight according to the outgoing-edge correlation and the incoming-edge correlation between partitions.

Specifically, the relevancies between partitions are calculated according to the outgoing-edge correlation and the incoming-edge correlation between partitions and the preset correlation matrix weight based on the following formula: $R_{ij} = \alpha OUT_{ij} + (1-\alpha) IN_{ij}$, where $\alpha$ is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

It should be noted that the value of weight $\alpha$ is set by a database operation administrator (DBA) based on a service scenario of a distributed database cluster, or set based on the weight of a historical query, and the specific value is not limited here.

In addition, due to a continuous write operation of the graph database, the correlation between partitions changes dynamically. By calculating the correlation matrix periodically, the current data situation can be learned, so as to optimize the distribution of partitions. This execution period can be customized, e.g., once a week or once a day.

In some embodiments, step S104 of storing partitions with high relevancies on a same storage server includes:
randomly acquiring any partition as a target partition; and
acquiring and storing a plurality of partitions having highest relevancies with the target partition;
where the target partition is a partition not stored in other data services, and each storage server stores a same number of partitions.

Specifically, the above steps are performed for each storage server, such that partitions with high relevancies are stored on the same storage server. When h partitions with highest relevancies with the target partition are obtained, the relevancies between the target partition and other partitions may be arranged in descending order, and the top h partitions selected based on the descending order may be used as the h partitions with the highest relevancies to the target partition, where the value of h may be determined based on the number of all partitions and the number of servers of the distributed graph database to ensure that each server stores h partitions. The implementation of the foregoing steps may be regarded as a greedy algorithm. A specific implementation of the greedy algorithm is described as follows:

Initialize

Step 1: Define R as the above correlation matrix.

Step 2: Define a matrix S of M×N (M is the number of machines in the distributed graph database, N is the number of partitions, and N=h×M), where $S_{ij}:=1$ if partition i is allowed to be stored on machine i; $S_{ij}:=0$ if partition i is not allowed to be stored on machine i. It should be noted that the initialization step is used to define which partitions are stored on which machines. The greedy algorithm can be made to support two data rebalancing operations: BALANCE DATA and BALANCE LEADER. For example, there are two rebalancing operations in Nebula Graph: BALANCE DATA and BALANCE LEADER, which correspond to data migration and leader migration, respectively. The BALANCE LEADER operation only allows partitions to be stored on machines with complete data copies (i.e., where the leader and follower are located), while BALANCE DATA allows partitions to be stored on all machines.

Step 3: Define a matrix RS of N×N, where $RS_{ij}:=0$ if $S_{ij}=0$, and $RS_{ij}:=1$ if $S_{ij}=1$.

Step 4: Define a function map(int, set[int]), where the first input parameter records a machine ID and the second input parameter is a set that records IDs of partitions distributed on the machine. During code implementation of set and map, which indexing method (red-black tree, hash table, etc.) is used and whether it is necessary to perform concurrent read and write depend on the context of the code implementation.

Based on the above initialization, the following pseudo-code is used for implementation:

```
for m in range 1 to M // for the m^th machine
{
int sum := 0;
for i in range 1 to N // for the i^th partition
{
// find h partitions with highest relevancies with partition i
take the i^th row of the matrix RS, which is RS_i;
find h maximum elements in RS_i, of which the coordinates are x_1^i..., x_h^i, respectively;
temp := R_{i, x_1}^i +...+ R_{i, x_h}^i;
if (sum < temp)
{
sum = temp;
map[m] . insert (x_1^i..., x_h^i);
}
}/ /map[m] is a set of IDs of h partitions with highest relevancies with partition i;
// these partitions are distributed on machine m, and do not need to participate in distribution computing of partitions on other machines subsequently.
{
traverse each element x in map[m]:
set row x and column x in RS to 0;
}
}
Return map;
```

By implementing the above pseudo-code, optimization of the partition distribution of the graph database can be accomplished by migrating partitions based on the relevancies between partitions (data locality).

It should be noted that the above correlation matrix R can be expressed as a complete graph with edges with weights, and the dimension of R is the number of partitions. Therefore, when partitions with high relevancies are stored on the same storage server, i.e., when the partition distribution is solved, the problem can be dimensionally reduced and converted into a graph partitioning problem: one graph has N vertices and N×N edges, and it is required to partition the graph into M balanced subgraphs. Therefore, since the value of N is usually small, an existing mature open source algorithm library (e.g., METIS) can be used for solving the problem.

Figure 2:
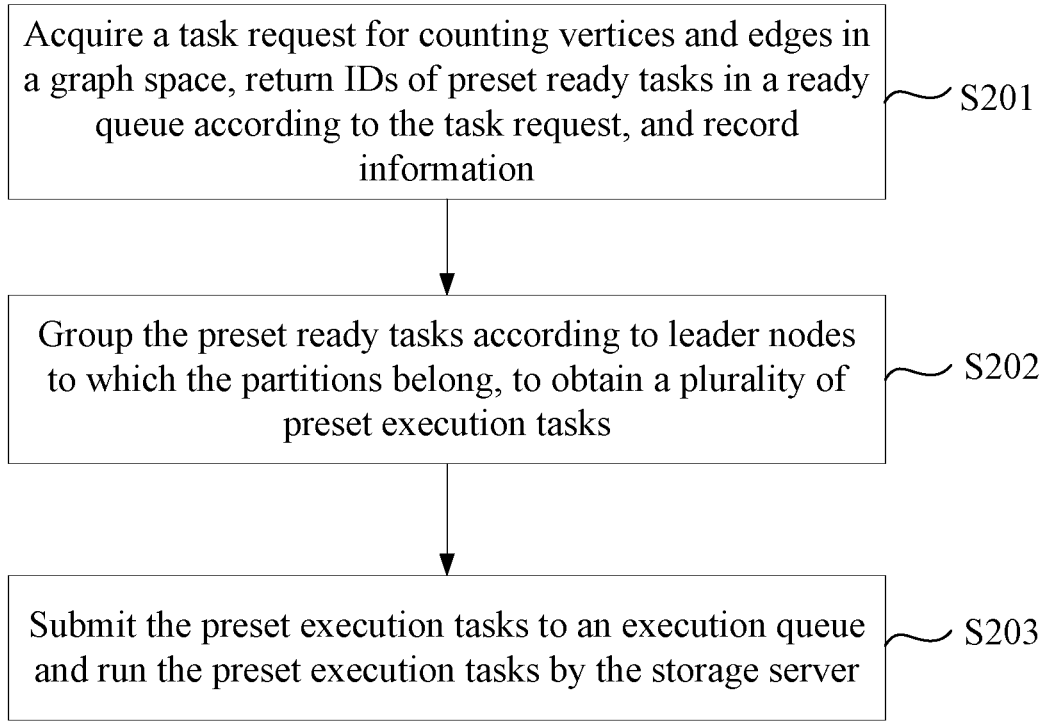
FIG. 2 is a flowchart of steps of a method for counting vertices and edges based on data storage optimization according to an embodiment of the present disclosure.

The embodiments of the present disclosure provide a method for optimizing data storage of query statistics of a graph database. FIG. 2 is a flowchart of steps of a method for counting vertices and edges based on data storage optimization according to an embodiment of the present disclosure. As shown in FIG. 2, after step S104 of storing partitions with high relevancies on a same storage server, the method further includes the following steps:

Step S201: Acquire a task request for counting vertices and edges in a graph space, return IDs of preset ready jobs in a ready queue according to the task request, and record information, where the graph space includes a plurality of partitions.

Step S202: Group the preset ready jobs according to leader nodes to which the partitions belong, to obtain a plurality of preset execution tasks.

Step S203: Submit the preset execution tasks to an execution queue and run the preset execution tasks by the storage server.

It should be noted that the implementation of this embodiment relies on the job mechanism and the task mechanism in the distributed graph database Nebula Graph.

Preset ready job (stats job): a task submitted by a user client to count the number of vertices and the number of edges in a certain graph space.

Preset execution task (stats task): a task obtained by grouping preset ready jobs according to a leader node to which the partitions belong.

Preset execution subtask (stats subtask): a task generated according to the partition and the preset execution task.

Steps S201 to S203 in the embodiments of the present disclosure implement an efficient parallel strategy for vertex-edge counting tasks based on the job mechanism and the task mechanism in Nebula Graph.

Figure 3:
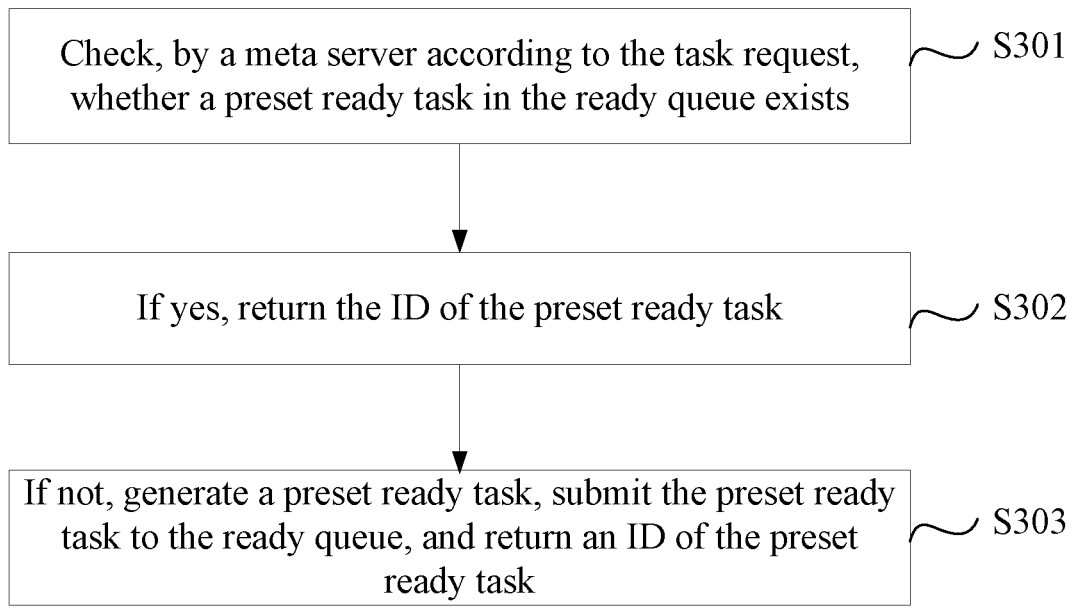
FIG. 3 is a flowchart of steps of checking preset ready jobs in a ready queue according to an embodiment of the present disclosure.

In some embodiments, FIG. 3 is a flowchart of steps of checking preset ready jobs in a ready queue according to an embodiment of the present disclosure. As shown in FIG. 3, step S201 of returning IDs of preset ready jobs according to the task request includes:

Step S301: Check, by a meta server according to the task request, whether a preset ready job in the ready queue exists.

Step S302: If yes, return the ID of the preset ready job.

Step S303: If not, generate a preset ready job, submit the preset ready job to the ready queue, and return an ID of the preset ready job.

In some embodiments, step S201 of recording information includes:
writing information records of the preset ready jobs into system tables of the preset ready jobs by a meta server according to the IDs of the preset ready jobs; and
writing an information record of the graph space into a system table of statistical information by the meta server according to an ID of the graph space.

In some embodiments, the submitting the preset execution tasks to an execution queue and running the preset execution tasks by the storage server includes:
writing information records of the preset execution tasks into system tables of the preset execution tasks by a meta server according to the IDs of the preset ready jobs and IDs of the preset execution tasks, and running the preset execution tasks by the storage server.

In some embodiments, the submitting the preset execution tasks to an execution queue and running the preset execution tasks by the storage server includes:
submitting the preset execution tasks to the execution queue by the storage server, generating preset execution subtasks according to the partitions, and running the preset execution subtasks by the storage server;
determining that running of a corresponding preset execution task succeeds if running of all preset execution subtasks in the preset execution task succeeds; or
determining that running of a corresponding preset execution task fails if running of a preset execution subtask in the preset execution task fails.

In some embodiments, after the running the preset execution tasks by the storage server, the method further includes:
checking whether running of the preset execution task succeeds;
if yes, setting a corresponding status record in a system table of the preset execution task to a finished state by a meta server, where
in a case that running of the preset execution task succeeds, a system table of statistical information is updated based on a locking mechanism according to a running result of the preset execution task, and
in a case that running of all the preset execution tasks is finished and successful, corresponding status records in the system table of the statistical information and system tables of the preset ready jobs are set to a finished state; or
if not, setting the corresponding status record in the system table of the preset execution task to a failed state by the meta server, where
in a case that running of the preset execution task fails, the system table of the statistical information is updated based on the locking mechanism according to the running result of the preset execution task, and
in a case that running of all the preset execution tasks is finished and a running failure occurs, corresponding status records in the system table of the statistical information and the system tables of the preset ready jobs are set to a failed state.

In some embodiments, the submitting the preset execution tasks to the execution queue by the storage server, generating preset execution subtasks according to the partitions, and running the preset execution subtasks by the storage server includes:
submitting the preset execution tasks to the execution queue by the storage server, generating the preset execution subtasks according to the partitions, collecting statistics about vertex and edge count information of the corresponding partitions through the preset execution subtasks, and aggregating statistical results of all the preset execution subtasks, where the vertex and edge count information includes the number of vertices with a same tag, the number of edges of a same type, and a total number of vertices and a total number of edges in the graph space.

In some embodiments, a user can run a query command (show jobs) to view a completion status of the preset ready job; in a case that running of the preset ready job is finished, the user runs a result query command (show stats) to view the statistics about the number of vertices and the number of edges.

It should be noted that the statistics include the case that running of the preset ready job succeeds and the case that running of the preset ready job fails.

In the case that running of the preset ready job succeeds, the user runs the result query command to view statistical information about the number of vertices and the number of edges. The statistical information includes data of all vertices/edges in the graph space, the number of vertices of each tag and the number of edges of each type.

In the case that running of the preset ready job fails, if the preset ready job in the graph space is run for the first time, query error information is returned when the user runs the result query command; otherwise, statistical information for the latest successful running of the preset ready job in the graph space is displayed.

Figure 4:
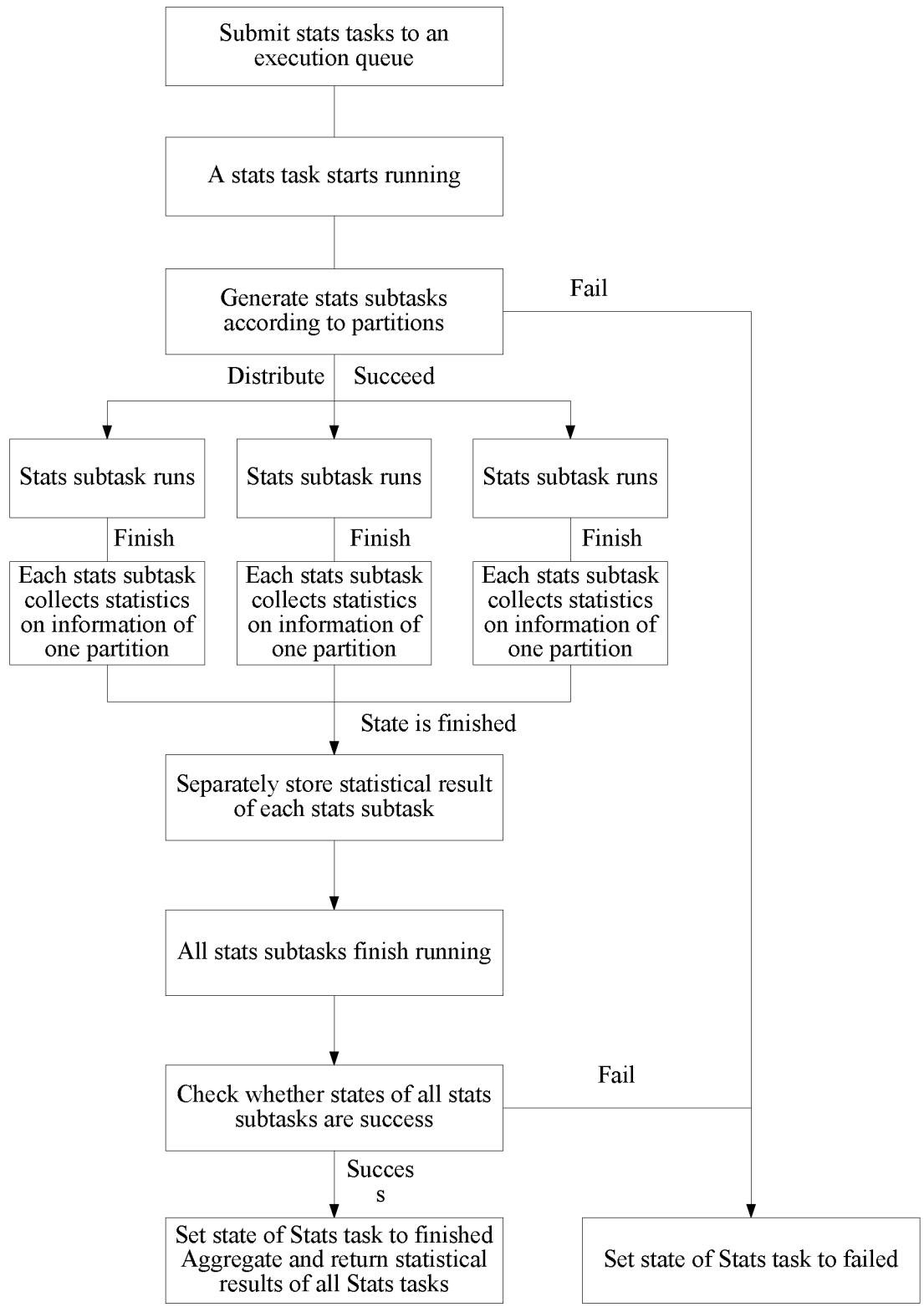
FIG. 4 is a schematic flowchart of running preset ready jobs according to an embodiment of the present disclosure.

In some specific embodiments, FIG. 4 is a schematic flowchart of running preset ready jobs according to an embodiment of the present disclosure. As shown in FIG. 4, the method includes the following steps:

Step 1: Acquire a preset ready job (stats job) for counting the number of vertices and the number of edges in a graph space (Space) from a ready queue.

Step 2: Initialize an information record of the preset ready job (stats job) and insert the information record into a system table of the preset ready job of a meta server 11; initialize an information record of statistical information (stats) and insert the information record into a system table of the statistical information of the meta server; if the preset ready job succeeds, perform step 3; if the preset ready job fails, perform step 10.

Step 3: Divide the preset ready job into a plurality of preset execution tasks (stats task) according to leader nodes to which partitions are located, initialize information records of the preset execution tasks and insert the information records into system tables of the preset execution tasks of the meta server; if the preset execution tasks succeed, perform step 4; if the preset execution tasks fail, perform step 10.

Step 4: Run multiple preset execution tasks (stats task) on the storage server.

Step 5: After each preset execution task (stats task) finishes running, update an information record in a system table of the preset execution task.

Step 6: Aggregate results of each preset execution task (stats task).

Step 7: All the preset execution tasks (stats task) finish running.

Step 8: Check whether the running results of all the preset execution tasks (stats task) are success; if yes, perform step 9; otherwise, perform step 10.

Step 9: Set a status record in the system table of the preset ready job (stats job) to a finished state; set a status record in the system table of the statistical information (stats) to a finished state.

Step 10: Set the status record in the system table of the preset ready job (stats job) to a failed state; set the status record in the system table of the statistical information (stats) to a failed state.

Steps 1 to 10 in the embodiments of the present disclosure reduces the waste of resources and improves efficiency of real-time statistics, and implement an efficient parallel strategy for vertex-edge counting tasks based on the job mechanism and the task mechanism in Nebula Graph.

Figure 5:
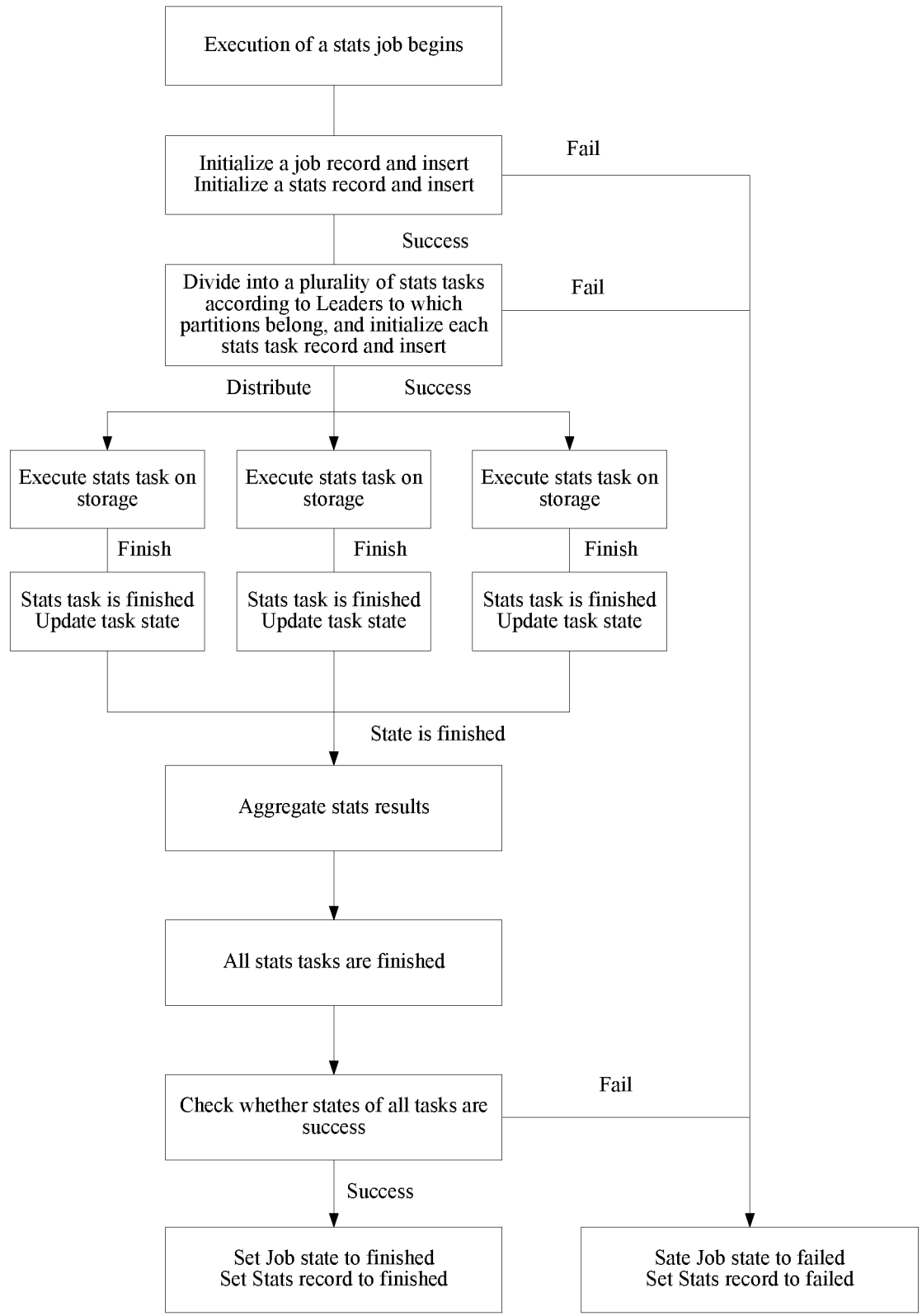
FIG. 5 is a schematic flowchart of running preset execution tasks according to an embodiment of the present disclosure.

In some embodiments, FIG. 5 is a schematic flowchart of running preset execution tasks according to an embodiment of the present disclosure. As shown in FIG. 5, the method includes the following steps:

Step 1: Submit preset execution tasks (stats task) to an execution queue.

Step 2: A preset execution task (stats task) starts running.

Step 3: Generate a plurality of preset execution subtask (stats subtask) according to partitions; if success, perform step 4; if failure, perform step 10.

Step 4: Run a plurality of preset execution subtasks (stats subtask) on the storage server, where multiple preset execution subtasks are run in parallel according to concurrency, when a preset execution subtask finishes running, if there are still preset execution subtasks to be run, the next preset execution subtask will be run, until all the preset execution subtasks finish running.

Step 5: After each preset execution subtask (stats subtask) finishes running, collect statistics about information of a partition.

Step 6: Aggregate statistical results of all the preset execution subtasks (stats subtask).

Step 7: All the preset execution subtasks (stats subtask) finish running.

Step 8: Check whether running results of all the preset execution subtasks (stats subtask) are success; if yes, perform step 9; if not, perform step 10.

Step 9: Set a status record in a system table of the preset execution task (stats task) to a finished state; return a statistical result of the preset execution task (stats task).

Step 10: Set the status record in the system table of the preset execution task (stats task) to a failed state.

Steps 1 to 10 in the embodiments of the present disclosure reduces the waste of resources and improves efficiency of real-time statistics, and implement an efficient parallel strategy for vertex-edge counting tasks based on the job mechanism and the task mechanism in Nebula Graph.

The embodiments of the present disclosure provide a method for optimizing data storage of query statistics of a graph database. After step S104 of storing partitions with high relevancies on a same storage server, the method further includes:

acquiring a task request for querying a data relationship, acquiring a start point and traversal depth as a query condition according to the task request, querying relational data of the start point according to the query condition, and querying whether there is a pre-read result in the storage server;

if yes, continuing to finish the data relationship query of the start point according to the pre-read result and the traversal depth; and if no, continuing to finish the data relationship query of the start point according to the relational data and the traversal depth.

It should be noted that regardless of the size of the graph, iteration of each round of graph traversal is to obtain multiple triplets starting from a given start point. The traversal query of the graph can be divided into breadth-first search (BFS) and depth-first search (DFS), and the bottom layer of almost all graph algorithms, such as connectivity, shortest path, and label propagation, depends on the traversal query capability of the graph. Therefore, the graph traversal query has an extremely obvious local access characteristics: <start point, outgoing edge 1 of start point, end point 1>, <start point, outgoing edge 2 of start point, end point 2> . . . .

Specifically, in order to further improve the graph query performance, after the goal of data locality is realized, i.e., after partitions with high relevancies are stored on the same server (machine), the pre-reading technique of graph traversal is realized through a preset query method to accelerate the query performance and reduce the RPC calls. The above preset query method in this embodiment is a function GetOutNeighors provided by the storage server, to be called by the query server through RPC with the following syntax:

Input: a set of start points vid <vids>, traversal depth k.

Output: a set of edges. Meaning: Get all k-hop outgoing edges starting from <vids>.

Similarly, a function GetInNeighors is further provided with the following syntax:

Input: start point <vids>, traversal depth k.

Output: a set of edges. Meaning: Get all k-hop incoming edges starting from vid.

In specific implementation, the input parameters of the function (preset query method) can further include: a list of starting points, an edge direction, a property name, whether to de-duplicate, whether to sort by properties, return to paging, etc. The output parameters can further include: point and edge properties, etc. It should be noted that in practical application, the query parameters are not limited to the parameters described above. The only difference between GetInNeighors and GetOutNeighors is that the directions of the edge traversal query are different, and the specific implementation is more or less the same.

In practical application, the above query steps can be implemented by GetOutNeighors, and the implementation of GetOutNeighors includes server-side implementation and client-side implementation. The server-side steps are as follows:

```
map<vid, set <vid>> GetOutNeighors (set <vid> ids , int h)
{
set <vid> J = Shard (i d s)
// map . first is a set of start points vids, map . second is a set of end points vids.
map<vid, set <vid>> res;
set <vid> L;
for i in range 1 to (h−1)
{
for each j ∈ J // concurrent execution
{
S [j].insert (dst (j));
L. insert (Shard (dst (j)):
}
J :=L;
L. clear ( );
}
Return S;
}
``` dst(j) is a set of end points vids initiated from the start point j; S[j].insert(•) is to add elements to the set in order, for example, S[1]={2,3,4,5}.

Preferably, in specific implementation, a paging manner can be used. For example, in for loop above, each time a round is completed (i.e., the $i^{th}$ hop), data in this round can be returned to the query server first. This allows the query server to continue to access other storage servers concurrently.

The client-side steps are as follows:

```
map<vid, set <vid>> GetOutNeighors (set <vid> ids, int h)
{//
cache . first is a start point, and cache . second is an end point
map<vid, set <vid>> cache;
set <vid> tosearch = ids;
for i in range 1 to (h−1)
{
{
// check the cache first,
for each element v in tosearch, check whether the element is also in cache.first,
if yes, delete the element v from tosearch
}
// obtain the server ip of each storage server from meta server, and initiates RPC to each ip
for each ip in Ip (Shard (tosearch))
{
temp = GetOutNeighorsIP (ip, Shard (tosearch), h)
// collect results from ip1, ip2...
cache [temp.first] = temp.second;
}
}
return cache;}
``` ip IP(set<vid>ids) is used for acquiring a machine ip corresponding to ids from the meta server. map<vid, set<vid>> GetOutNeighorsIP (IP ip, set<vid>ids, int h) is used for calling GetOutNeighors (ids, h) from the server according to IP.

Preferably, during execution of GetOutNeighors( ), the maximum number of returns can be limited, the full step is stopped when the count is greater than a threshold.

By implementing pre-reading in the above query step, a maximum amount of pre-reading information is carried in each RPC. The amount of RPC data in the first few layers of k-hop is increased and the amount of RPC data during the last few layers of k-hop is reduced (k-hop grows exponentially and the amount of RPC data in the last few layers almost completely determines the performance of the entire k-hop). On the basis of optimizing partition distribution and improving data locality, the performance of k-hop query is accelerated by the pre-reading technique, i.e., the query performance of the graph database is improved.

It should be noted that, steps shown in the foregoing process or the flowchart in the accompanying drawings may be executed in a computer system such as a set of computer executable instructions. Moreover, although a logic sequence is shown in the flowchart, the shown or described steps may be executed in a sequence different from that described here.

Figure 6:
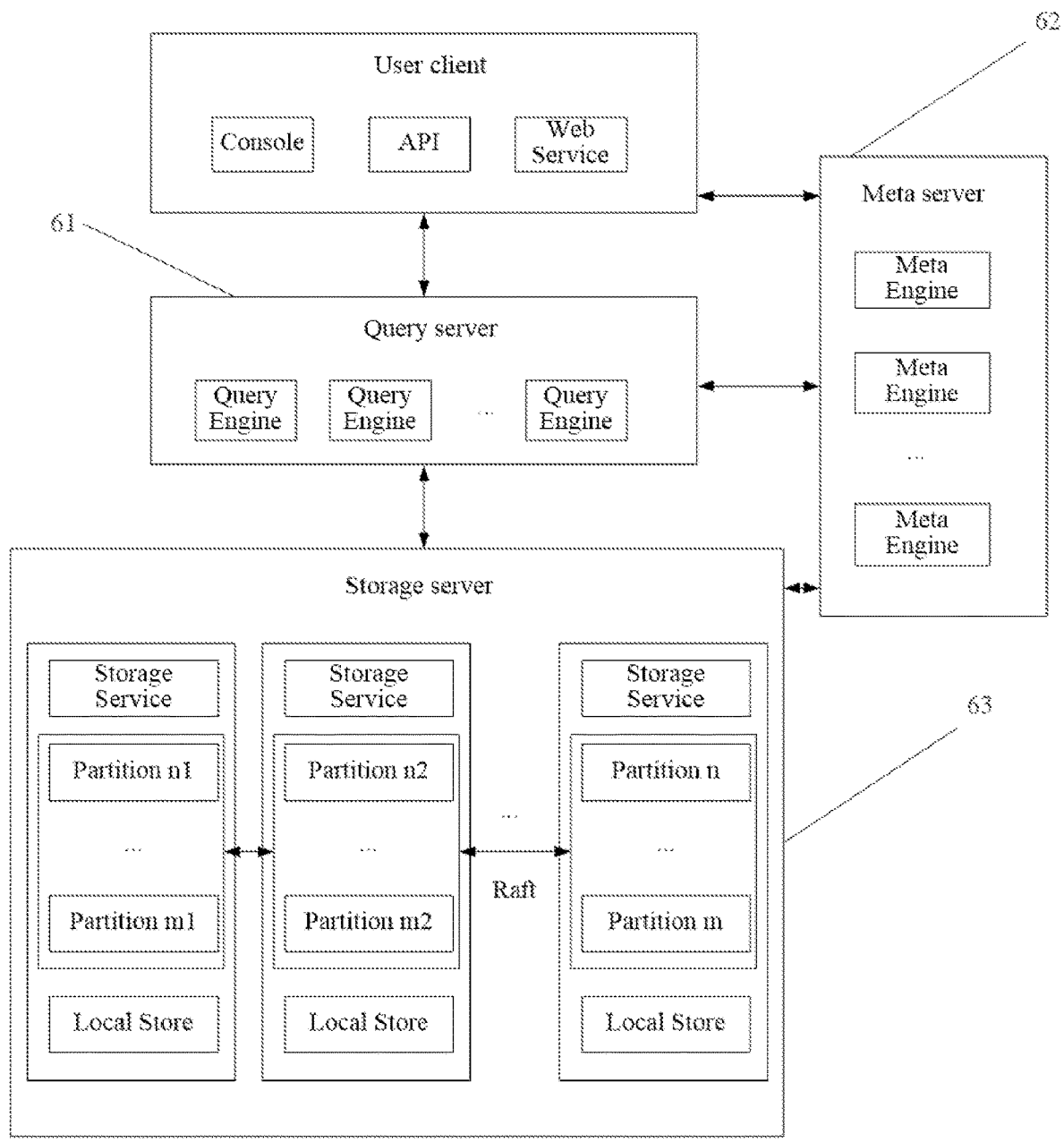
FIG. 6 is a structural block diagram of a system for optimizing data storage of query statistics of a graph database according to an embodiment of the present disclosure.

The embodiments of the present disclosure provide a system for optimizing data storage of query statistics of a graph database. system. FIG. 6 is a structural block diagram of a system for optimizing data storage of query statistics of a graph database according to an embodiment of the present disclosure. As shown in FIG. 6, the system includes a query server 61, a meta server 62, and storage servers 63. The system is connected to a user client 64.

The meta server 62 periodically scans, on the storage servers in which partitions are located, all edges in the partitions.

The storage server 63 determines, according to all the edges in the partitions, partitions to which start points and end points belong, and calculates outgoing-edge correlation and incoming-edge correlation between partitions.

The storage server 63 calculates relevancies between partitions through a preset correlation matrix weight according to the outgoing-edge correlation and the incoming-edge correlation between partitions, where partitions with high relevancies are stored on a same storage server 63.

In some embodiments, the storage server 63 calculates the outgoing-edge correlation and the incoming-edge correlation between partitions in the following manner:
calculating the outgoing-edge correlation between partitions based on the following formula:

$$OUT_{ij} \triangleq \begin{cases} \frac{\text{out\_edge\_count}_i^j}{\text{out\_total\_edge}_i} & \text{if } i \neq j \\ 1 & \text{if } i = j \end{cases}$$

where $OUT_{ij}$ represents outgoing-edge correlation between partition i and partition j, $\text{out\_total\_edge}_i$ represents a total number of outgoing edges with start points in partition i, and $\text{out\_edge\_count}_i^j$ represents the number of outgoing edges with start points located in partition i and end points located in partition j; and calculating the incoming-edge correlation between partitions based on the following formula:

$$IN_{ij} \triangleq \begin{cases} \frac{\text{in\_edge\_count}_i^j}{\text{in\_total\_edge}_i} & \text{if } i \neq j \\ 1 & \text{if } i = j \end{cases}$$

where $IN_{ij}$ represents incoming-edge correlation between partition i and partition j, $\text{in\_total\_edge}_i$ represents a total number of incoming edges with end points in partition i, and $\text{in\_edge\_count}_i^j$ represents the number of incoming edges with start points located in partition j and end points located in partition i.

In some embodiments, the storage server 63 calculates the relevancies between partitions through the preset correlation matrix weight in the following manner:
calculating the relevancies between partitions according to the preset correlation matrix weight based on the following formula: $R_{ij} = \alpha OUT_{ij} + (1-\alpha) IN_{ij}$, where $\alpha$ is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

In some embodiments, after the partitions with high relevancies are stored on the same storage server 63,
the query server 61 acquires a task request for counting vertices and edges in a graph space, and the meta server 62 checks preset ready jobs in a ready queue according to the task request, and returns IDs of the preset ready jobs;
the meta server 62 writes information records of the preset ready jobs into system tables of the preset ready jobs according to the IDs of the preset ready jobs, and the meta server 62 writes an information record of the graph space into a system table of statistical information according to an ID of the graph space.
the graph space includes a plurality of partitions, and the meta server 62 groups the preset ready jobs according to leader nodes to which the partitions belong, to obtain a plurality of preset execution tasks; and
the meta server 62 sends the preset execution tasks to the storage server 63, the storage server 63 submits the preset execution tasks to an execution queue, and the storage server 63 runs the preset execution tasks.

In some embodiments, after the partitions with high relevancies are stored on the same storage server 63,
the query server 61 acquires a task request for querying a data relationship;
the storage server 63 acquires a start point and traversal depth as a query condition according to the task request, queries relational data of the start point according to the query condition, and queries whether there is a pre-read result in the storage server 63;
if yes, the storage server continues to finish the data relationship query of the start point according to the pre-read result and the traversal depth; and
if no, the storage server continues to finish the data relationship query of the start point according to the relational data and the traversal depth.

It should be noted that each of the above modules may be a functional module or a program module, and may be implemented by software or hardware. For modules implemented by hardware, the modules can be located in the same processor; or the modules, in any combination, can be located in different processors.

This embodiment further provides an electronic device, including a memory and a processor. The memory stores a computer program, and the processor is configured to perform the steps in any of the method embodiments above by running the computer program.

Optionally, the electronic device may further include a transmission apparatus and an input/output apparatus, where the transmission apparatus is connected to the processor described above, and the input/output apparatus is connected to the processor described above.

It should be noted that, for the specific example in this embodiment, reference may be made to the example described in the embodiments and optional implementation manners described above. Details are not described herein again.

In addition, an embodiment of the present disclosure can provide a storage medium with reference to the method for optimizing data storage of query statistics of a graph database in the foregoing embodiments. The storage medium stores a computer program. When the computer program is executed by a processor, any method for optimizing data storage of query statistics of a graph database in the foregoing embodiments is implemented.

In an embodiment, a computer device is provided. The computer device may be a terminal. The computer device includes a processor, a memory, a network interface, a display, and an input apparatus which are connected through a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for operations of the operating system and the computer program in the nonvolatile storage medium. The network interface of the computer device is configured to communicate with an external terminal through a network. When the computer program is executed by the processor, a method for optimizing data storage of query statistics of a graph database is implemented. The display of the computer device may be an LCD or an e-ink display; the input apparatus of the computer device may be a touch layer covering the display, or a key, a trackball or a touchpad set on the housing of the computer device, or an external keyboard, a touchpad or a mouse, etc.

Figure 7:
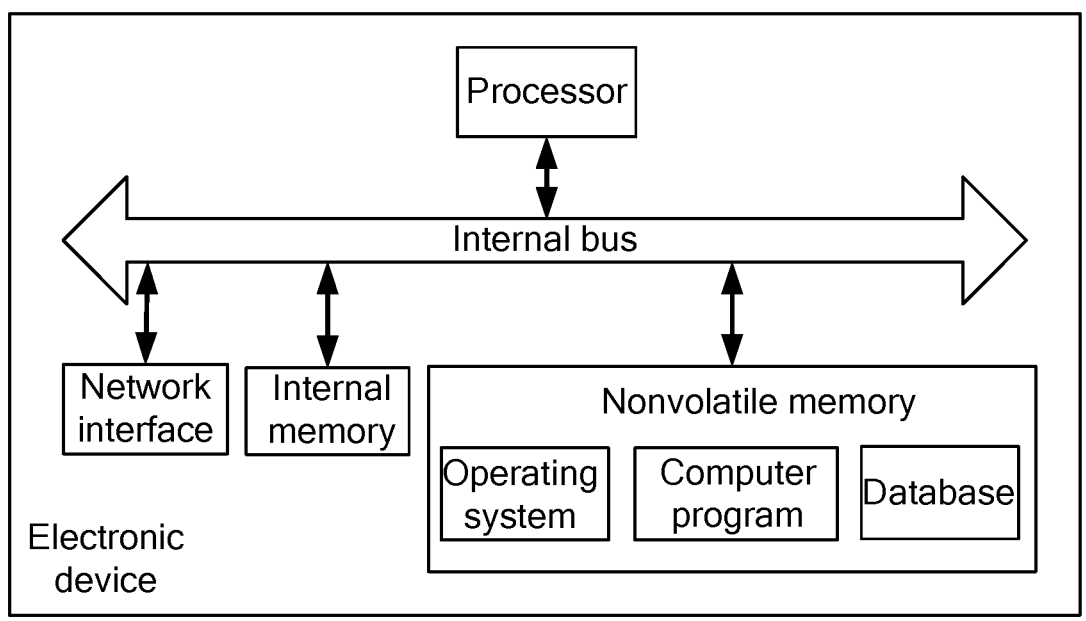
FIG. 7 is a schematic diagram of an internal structure of an electronic device according to an embodiment of the present disclosure.

In an example, FIG. 7 is a schematic diagram of an internal structure of an electronic device according to an embodiment of the present disclosure. As shown in FIG. 7, an electronic device is provided. The electronic device may be a server, and an internal structure thereof may be as shown in FIG. 7. The electronic device includes a processor, a network interface, an internal memory, and a nonvolatile memory that are connected through an internal bus, where the nonvolatile memory stores an operating system, a computer program, and a database. The processor is configured to provide a computing and control capability. The network interface is configured to provide communication with an external terminal through a network connection. The internal memory is configured to provide an environment for running of an operating system and a computer program. When being executed by a processor, the computer program implements the method for optimizing data storage of query statistics of a graph database. The database is configured to store data.

Those skilled in the art may understand that the structure shown in FIG. 7 is only a block diagram of a part of the structure related to the solution of the present disclosure and does not constitute a limitation on an electronic device to which the solution of the present disclosure is applied. Specifically, the electronic device may include more or fewer components than those shown in the figures, or some components may be combined, or different component arrangements may be used.

Those of ordinary skill in the art may understand that all or some of the procedures in the methods of the foregoing embodiments may be implemented by a computer program instructing related hardware. The computer program may be stored in a nonvolatile computer readable storage medium. When the computer program is executed, the procedures in the embodiments of the foregoing methods may be performed. Any reference used for a memory, a storage, a database, or other mediums used in various embodiments provided in the present disclosure may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

A person skilled in the art should understand that, the technical features of the above embodiments can be arbitrarily combined. In an effort to provide a concise description, not all possible combinations of all the technical features of the embodiments are described. However, these combinations of technical features should be construed as disclosed in the description as long as no contradiction occurs.

The above embodiments are merely illustrative of several implementation manners of the present disclosure, and the description thereof is more specific and detailed, but is not to be construed as a limitation to the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the patent of the present disclosure should be subject to the appended claims.

What is claimed is:

1. A method for optimizing data storage of query statistics of a graph database, comprising:
   periodically scanning, on storage servers in which partitions are located, all edges in the partitions;
   determining, according to all the edges in the partitions, partitions to which start points and end points belong, and calculating outgoing-edge correlation and incoming-edge correlation between partitions;
   calculating relevancies between partitions through a preset correlation matrix weight according to the outgoing-edge correlation and the incoming-edge correlation between partitions; and
   storing partitions with high relevancies on a same storage server;
   wherein the calculating outgoing-edge correlation and incoming-edge correlation between partitions comprises:

calculating the outgoing-edge correlation between partitions based on the following formula:

$$OUT_{ij} \triangleq \begin{cases} \dfrac{\text{out\_edge\_count}_i^j}{\text{out\_total\_edge}_i} & \text{if } i \neq j \\ 1 & \text{if } i = j \end{cases},$$

wherein $OUT_{ij}$ represents outgoing-edge correlation between partition i and partition j, $\text{out\_total\_edge}_i$ represents a total number of outgoing edges with start points in partition i, and $\text{out\_edge\_count}_i^j$ represents the number of outgoing edges with start points located in partition i and end points located in partition j; and
calculating the incoming-edge correlation between partitions based on the following formula:

$$IN_{ij} \triangleq \begin{cases} \dfrac{\text{in\_edge\_count}_i^j}{\text{in\_total\_edge}_i} & \text{if } i \neq j; \\ 1 & \text{if } i = j \end{cases},$$

wherein $IN_{ij}$ represents incoming-edge correlation between partition i and partition j, $\text{in\_total\_edge}_i$ represents a total number of incoming edges with end points in partition i, and $\text{in\_edge\_count}_i^j$ represents the number of incoming edges with start points located in partition j and end points located in partition i;
wherein the calculating relevancies between partitions through a preset correlation matrix weight according to the outgoing-edge correlation and the incoming-edge correlation between partitions comprises:
calculating the relevancies between partitions according to the outgoing-edge correlation and the incoming-edge correlation between partitions and the preset correlation matrix weight based on the following formula:
$R_{ij} = \alpha OUT_{ij} + (1-\alpha)IN_{ij}$, wherein $\alpha$ is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

2. The method according to claim 1, wherein the storing partitions with high relevancies on a same storage server comprises: performing the following steps for each storage server:
randomly acquiring any partition as a target partition; and
acquiring and storing a plurality of partitions having highest relevancies with the target partition;
wherein the target partition is a partition not stored in other data services, and each storage server stores a same number of partitions.

3. The method according to claim 1, wherein the storing partitions with high relevancies on a same storage server comprises:
storing the partitions in a distributed manner through a METIS algorithm or a greedy algorithm, and storing partitions with high relevancies on a same storage server.

4. The method according to claim 1, wherein after the storing partitions with high relevancies on a same storage server, the method further comprises:
acquiring a query statistics request for data, and conducting query statistics on data in the partitions according to the query statistics request.

5. The method according to claim 4, wherein the acquiring a query statistics request for data, and conducting query statistics on data in the partitions according to the query statistics request comprises:
acquiring a task request for counting vertices and edges in a graph space, returning IDs of preset ready jobs in a ready queue according to the task request, and recording information, wherein the graph space comprises a plurality of partitions;
grouping the preset ready jobs according to leader nodes to which the partitions belong, to obtain a plurality of preset execution tasks; and
submitting the preset execution tasks to an execution queue and running the preset execution tasks by the storage server.

6. The method according to claim 5, wherein the returning IDs of preset ready jobs according to the task request comprises:
checking, by a meta server according to the task request, whether a preset ready job in the ready queue exists;
if yes, returning the ID of the preset ready job; or
if not, generating a preset ready job, submitting the preset ready job to the ready queue, and returning an ID of the preset ready job.

7. The method according to claim 5, wherein the recording information comprises:
writing information records of the preset ready jobs into system tables of the preset ready jobs by a meta server according to the IDs of the preset ready jobs; and
writing an information record of the graph space into a system table of statistical information by the meta server according to an ID of the graph space.

8. The method according to claim 5, wherein the submitting the preset execution tasks to an execution queue and running the preset execution tasks by the storage server comprises:
writing information records of the preset execution tasks into system tables of the preset execution tasks by a meta server according to the IDs of the preset ready jobs and IDs of the preset execution tasks, and running the preset execution tasks by the storage server.

9. The method according to claim 5, wherein the submitting the preset execution tasks to an execution queue and running the preset execution tasks by the storage server comprises:
submitting the preset execution tasks to the execution queue by the storage server, generating preset execution subtasks according to the partitions, and running the preset execution subtasks by the storage server;
determining that running of a corresponding preset execution task succeeds if running of all preset execution subtasks in the preset execution task succeeds; or
determining that running of a corresponding preset execution task fails if running of a preset execution subtask in the preset execution task fails.

10. The method according to claim 9, wherein after the running the preset execution tasks by the storage server, the method further comprises:
checking whether running of the preset execution task succeeds;
if yes, setting a corresponding status record in a system table of the preset execution task to a finished state by a meta server, wherein
in a case that running of the preset execution task succeeds, a system table of statistical information is updated based on a locking mechanism according to a running result of the preset execution task, and in a case that running of all the preset execution tasks is finished and successful, corresponding status records in the system table of the statistical information and system tables of the preset ready jobs are set to a finished state; or if not, setting the corresponding status record in the system table of the preset execution task to a failed state by the meta server, wherein in a case that running of the preset execution task fails, the system table of the statistical information is updated based on the locking mechanism according to the running result of the preset execution task, and in a case that running of all the preset execution tasks is finished and a running failure occurs, corresponding status records in the system table of the statistical information and the system tables of the preset ready jobs are set to a failed state.

11. The method according to claim 9, wherein the submitting the preset execution tasks to the execution queue by the storage server, generating preset execution subtasks according to the partitions, and running the preset execution subtasks by the storage server comprises:

submitting the preset execution tasks to the execution queue by the storage server, generating the preset execution subtasks according to the partitions, collecting statistics about vertex and edge count information of the corresponding partitions through the preset execution subtasks, and aggregating statistical results of all the preset execution subtasks, wherein the vertex and edge count information comprises the number of vertices with a same tag, the number of edges of a same type, and a total number of vertices and a total number of edges in the graph space.

12. The method according to claim 4, wherein the acquiring a query statistics request for data, and conducting query statistics on data in the partitions according to the query statistics request comprises:

acquiring a task request for querying a data relationship, acquiring a start point and traversal depth as a query condition according to the task request, querying relational data of the start point according to the query condition, and querying whether there is a pre-read result in the storage server;

if yes, continuing to finish the data relationship query of the start point according to the pre-read result and the traversal depth; and if no, continuing to finish the data relationship query of the start point according to the relational data and the traversal depth.

13. The method according to claim 12, wherein after the data relationship query of the start point is finished, the method further comprises:

obtaining a query result and the pre-read result after finishing the data relationship query of the start point, and caching the pre-read result in the storage server.

14. A computer device comprising a memory and a processor, wherein the processor is configured to execute non-transitory computer instructions for optimizing data storage of query statistics of a graph database, comprising a query server, a meta server, and storage servers;

wherein the meta server periodically scans, on the storage servers in which partitions are located, all edges in the partitions;

the storage server determines, according to all the edges in the partitions, partitions to which start points and end points belong, and calculates outgoing-edge correlation and incoming-edge correlation between partitions; and the storage server calculates relevancies between partitions through a preset correlation matrix weight according to the outgoing-edge correlation and the incoming-edge correlation between partitions, wherein partitions with high relevancies are stored on a same storage server;

wherein the calculating outgoing-edge correlation and incoming-edge correlation between partitions comprises:

calculating the outgoing-edge correlation between partitions based on the following formula:

$$OUT_{ij} \triangleq \begin{cases} \dfrac{\text{out\_edge\_count}_i^j}{\text{out\_total\_edge}_i} & \text{if } i \neq j, \\ 1 & \text{if } i = j \end{cases}$$

wherein $OUT_{ij}$ represents outgoing-edge correlation between partition i and partition j, $\text{out\_total\_edge}_i$ represents a total number of outgoing edges with start points in partition i, and $\text{out\_edge\_count}_i^j$ represents the number of outgoing edges with start points located in partition i and end points located in partition j; and calculating the incoming-edge correlation between partitions based on the following formula:

$$IN_{ij} \triangleq \begin{cases} \dfrac{\text{in\_edge\_count}_i^j}{\text{in\_total\_edge}_i} & \text{if } i \neq j; \\ 1 & \text{if } i = j \end{cases}$$

wherein $IN_{ij}$ represents incoming-edge correlation between partition i and partition j, $\text{in\_total\_edge}_i$ represents a total number of incoming edges with end points in partition i, and $\text{in\_edge\_count}_i^j$ represents the number of incoming edges with start points located in partition j and end points located in partition i;

wherein the calculating relevancies between partitions through a preset correlation matrix weight according to the outgoing-edge correlation and the incoming-edge correlation between partitions comprises:

calculating the relevancies between partitions according to the outgoing-edge correlation and the incoming-edge correlation between partitions and the preset correlation matrix weight based on the following formula:

$R_{ij}=\alpha OUT_{ij}+(1-\alpha)IN_{ij}$, wherein $\alpha$ is the preset correlation matrix weight, $R_{ij}$ represents a relevancy between partition i and partition j, $OUT_{ij}$ represents outgoing-edge correlation between partition i and partition j, and $IN_{ij}$ represents incoming-edge correlation between partition i and partition j.

15. The computer device according to claim 14, wherein after the execution of non-transitory computer instruction by processor causes the partitions with high relevancies to stored on the same storage server, upon execution of further computer instruction by the processor:

the query server acquires a task request for counting vertices and edges in a graph space, and the meta server checks preset ready jobs in a ready queue according to the task request, and returns IDs of the preset ready jobs;

the meta server writes information records of the preset ready jobs into system tables of the preset ready jobs according to the IDs of the preset ready jobs, and the meta server writes an information record of the graph space into a system table of statistical information according to an ID of the graph space;

the graph space includes a plurality of partitions, and the meta server groups the preset ready jobs according to leader nodes to which the partitions belong, to obtain a plurality of preset execution tasks; and the meta server sends the preset execution tasks to the storage server, the storage server submits the preset execution tasks to an execution queue, and the storage server runs the preset execution tasks.

16. The computer device according to claim 14, wherein after the partitions with high relevancies are stored on the same storage server, upon execution of further computer instruction by the processor:

the query server acquires a task request for querying a data relationship;

the storage server acquires a start point and traversal depth as a query condition according to the task request, queries relational data of the start point according to the query condition, and queries whether there is a pre-read result in the storage server;

if yes, the storage server continues to finish the data relationship query of the start point according to the pre-read result and the traversal depth; and if no, the storage server continues to finish the data relationship query of the start point according to the relational data and the traversal depth.

* * * * *